(12) United States Patent
Evans

(10) Patent No.: US 7,202,803 B2
(45) Date of Patent: Apr. 10, 2007

(54) METHODS AND SYSTEMS FOR SYNCHRONIZING DATA STREAMS

(75) Inventor: Glenn F. Evans, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 144 days.

(21) Appl. No.: 11/062,666

(22) Filed: Feb. 22, 2005

(65) Prior Publication Data

US 2005/0146448 A1    Jul. 7, 2005

Related U.S. Application Data

(62) Division of application No. 10/047,862, filed on Jan. 15, 2002, now Pat. No. 6,930,620.

(51) Int. Cl.
*H03M 7/00* (2006.01)

(52) U.S. Cl. .................. 341/50; 709/248; 713/400; 370/507; 375/240.28

(58) Field of Classification Search ............... 341/61; 370/503, 507; 375/240.28; 709/248; 713/400, 713/600
See application file for complete search history.

(56) References Cited

U.S. PATENT DOCUMENTS

| | | | |
|---|---|---|---|
| 5,396,497 A * | 3/1995 | Veltman | 375/240.25 |
| 5,815,689 A * | 9/1998 | Shaw et al. | 713/400 |
| 5,913,038 A | 6/1999 | Griffiths | |
| 6,111,896 A * | 8/2000 | Slattery et al. | 370/535 |
| 6,594,773 B1 | 7/2003 | Lisitsa et al. | |
| 6,647,210 B1 | 11/2003 | Toyoda et al. | |
| 6,680,753 B2 | 1/2004 | Kahn | |
| 6,774,919 B2 | 8/2004 | Miller et al. | |
| 7,023,924 B1 * | 4/2006 | Keller et al. | 375/240.26 |
| 2002/0078243 A1 * | 6/2002 | Rich et al. | 709/248 |
| 2002/0099870 A1 | 7/2002 | Miller et al. | |
| 2002/0111980 A1 | 8/2002 | Miller et al. | |
| 2002/0141452 A1 * | 10/2002 | Mauritz et al. | 370/503 |
| 2003/0103486 A1 * | 6/2003 | Salt et al. | 370/350 |

* cited by examiner

*Primary Examiner*—Howard L. Williams

(57) ABSTRACT

Methods and systems are provided for synchronizing various time-stamped data streams. The data streams can be synchronized to another data stream or to a point of reference such as a reference clock. In one embodiment, synchronization processing takes place in association with a filter graph comprising multiple filters. The filter graph is configured to process multiple timestamped data streams for rendering the data streams in accordance with data stream timestamps. A synchronization module is provided and is associated with the filter graph queries individual filters of the filter graph to ascertain input timestamp-to-output timestamp mappings. The module computes adjustments that are to be made to output time stamps in order to synchronize the data streams, and then instructs queried filters to adjust their output timestamps in accordance with its adjustment computations.

13 Claims, 9 Drawing Sheets

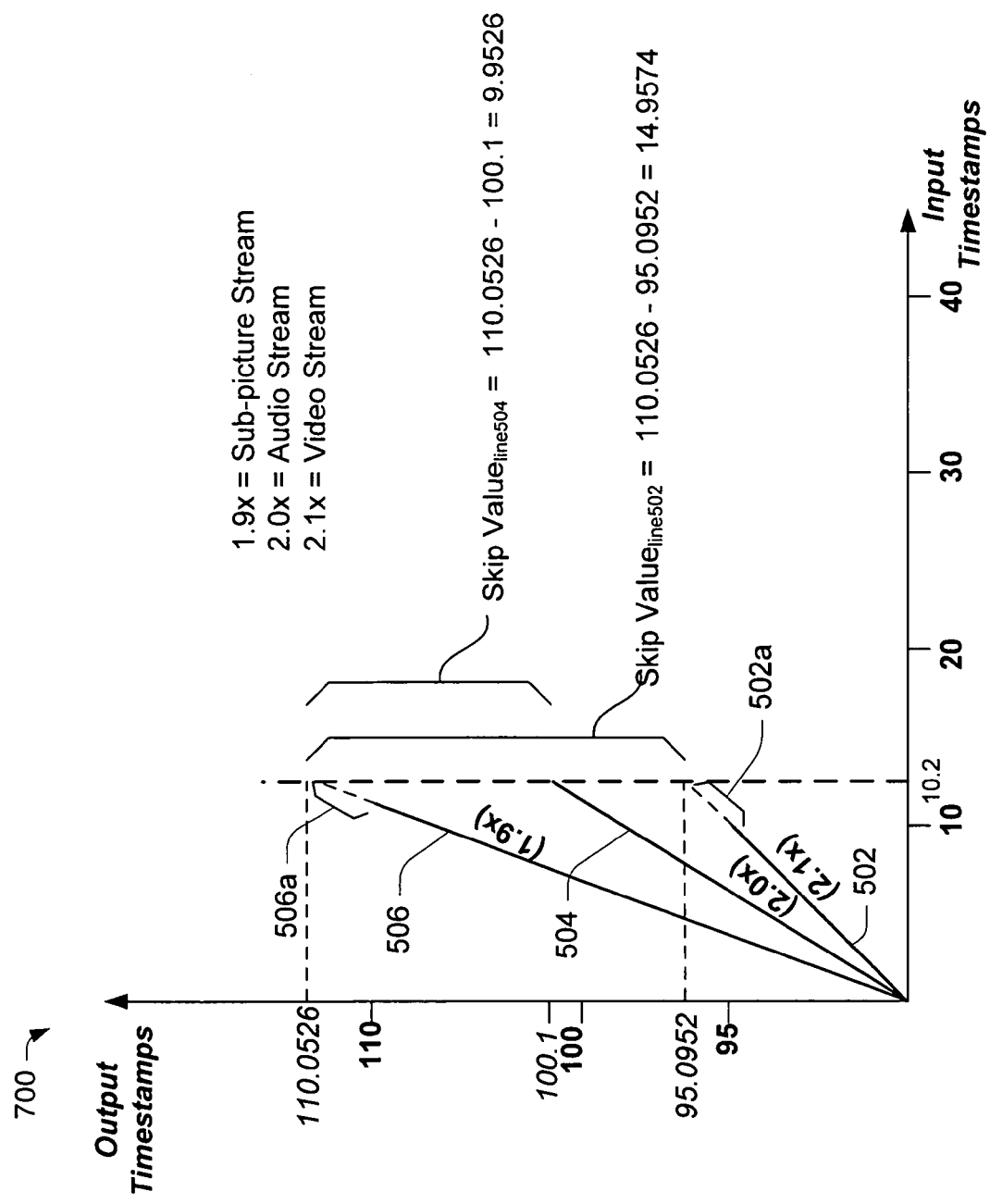

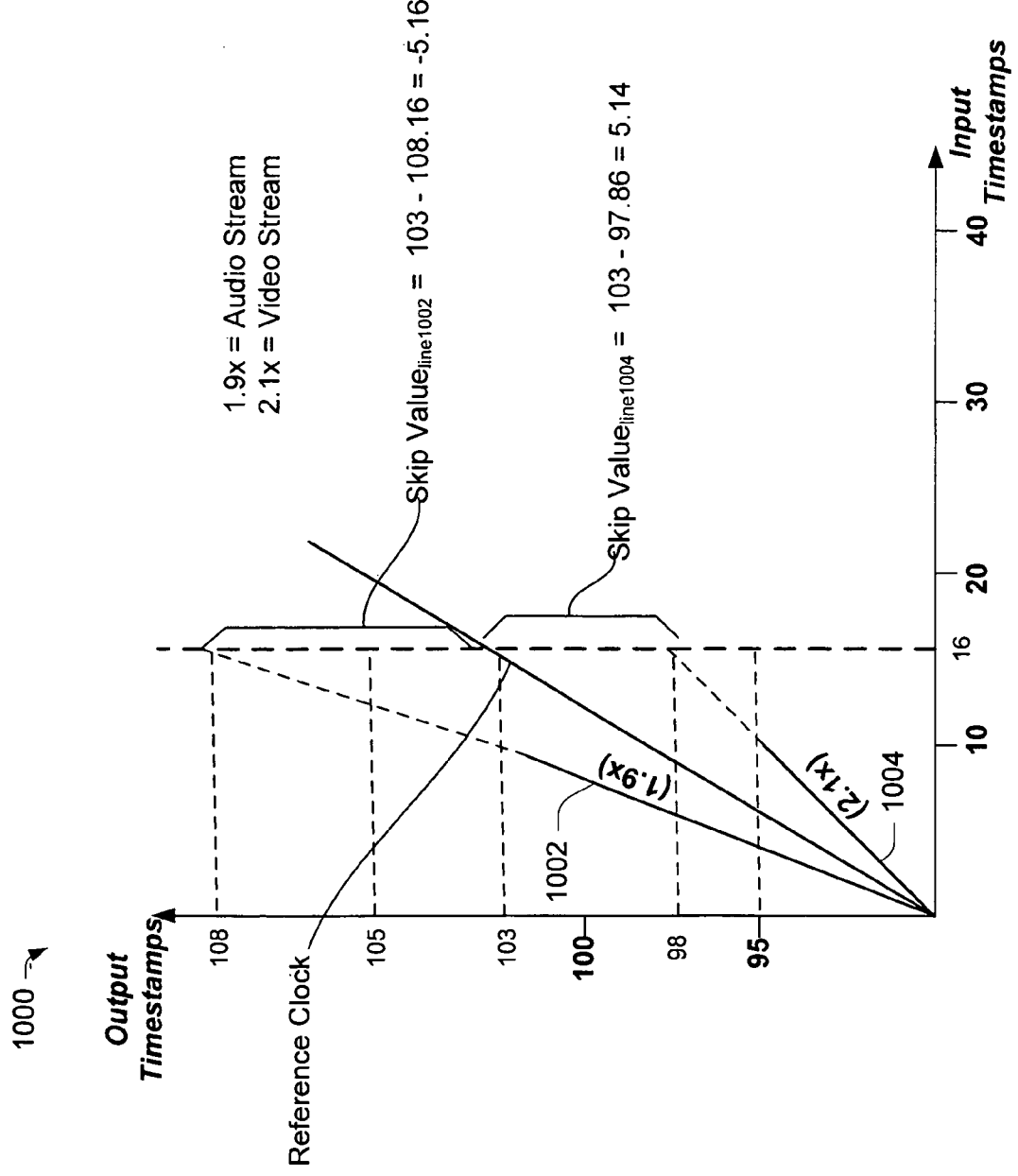

METHODS AND SYSTEMS FOR SYNCHRONIZING DATA STREAMS

RELATED APPLICATION

This is a divisional of and claims priority to U.S. patent application Ser. No. 10/047,862, filed on Jan. 15, 2002 is now a U.S. Pat. No. 6,930,620, the disclosure of which is incorporated by reference herein.

TECHNICAL FIELD

This invention relates generally to processing media content and, more particularly, to systems and methods for synchronizing media streams.

BACKGROUND

Recent advances in computing power and related technology have fostered the development of a new generation of powerful software applications. Gaming applications, communications applications, and multimedia applications have particularly benefited from increased processing power and clocking speeds. Indeed, once the province of dedicated, specialty workstations, many personal computing systems now have the capacity to receive, process and render multimedia objects (e.g., audio and video content). While the ability to display (receive, process and render) multimedia content has been around for a while, the ability for a standard computing system to support true multimedia editing applications is relatively new.

In an effort to satisfy this need, Microsoft Corporation introduced an innovative development system supporting advanced user-defined multimedia editing functions. An example of this architecture is described in U.S. Pat. No. 5,913,038, issued to Griffiths and commonly owned by the assignee of this document, the disclosure of which is expressly incorporated herein by reference.

In the '038 patent, Griffiths introduced an application program interface which, when exposed to higher-level development applications, enables a user to graphically construct a multimedia processing project by piecing together a collection of "filters" exposed by the interface. The interface described therein is referred to as a filter graph manager. The filter graph manager controls the data structure of the filter graph and the way that data moves through the filter graph. The filter graph manager provides a set of object model interfaces for communication between a filter graph and its application. Filters of a filter graph architecture implement one or more interfaces, each of which contains a predefined set of functions, called methods. Methods are called by an application program or other objects in order to communicate with the object exposing the interface. The application program can also call methods or interfaces exposed by the filter graph manager object.

Filter graphs work with data representing a variety of media (or non-media) data types, each type characterized by a data stream that is processed by the filter components comprising the filter graph. A filter positioned closer to the source of the data is referred to as an upstream filter, while those further down the processing chain is referred to as a downstream filter. For each data stream that the filter handles it exposes at least one virtual pin (i.e., distinguished from a physical pin such as one might find on an integrated circuit). A virtual pin can be implemented as an object that represents a point of connection for a unidirectional data stream on a filter. Input pins represent inputs and accept data into the filter, while output pins represent outputs and provide data to other filters. Each of the filters includes at least one memory buffer, and communication of the media stream between filters is often accomplished by a series of "copy" operations from one filter to another.

A filter graph can have a number of different types of filters, examples of which include source filters, decoder filters, transform filters, and render filters. A source filter is used to load data from some source, a decoder filter is used to decode or decompress a compressed data stream, a transform filter processes and passes data, and a render filter renders data to a hardware device or other locations (e.g., to a file, etc.).

FIG. 1 shows an exemplary filter graph 100 for rendering media content. Filter graph 100 comprises a number of different filters 104–110 and may or may not comprise a source 102. A typical filter graph for multimedia content can include, for example, of graph portion that is dedicated to processing video content and a graph portion that is dedicated to processing audio content. For example, in FIG. 1 a source 102 provides content that is typically in compressed form. A source filter 104 receives the content and then provides the content to one or more decoder filters for decompression. In this example, consider that filters 106–110 process video content, filters 106a–108a process sub-picture content (such as that used in Digital Video Data (DVD)), and filters 106b–110b process audio content. Accordingly, the decoder filters decompress the data and provide the data to a transform filter (e.g. filters 108–108b) that operates on the data in some way. The transform filters then provide the transformed data to a corresponding render filter (e.g. 110, 110b) that then renders the data.

Typically, an application program or application 112 provides a means by which a user can interact with the content that is processed by the filter graph. Responsive to a user interacting with the application, the application can issue commands to the source filter 104. Examples of commands can include Run, Stop, Fast Forward, Rewind, Jump and the like. The source filter receives the commands and then takes steps to ensure that the commands are executed at the right time. For example, the source filter 104 typically receives data and provides timestamps onto data samples that define when the data sample is to be rendered by the render filters. The source filter then hands the timestamped data sample off to the decoder for further processing. The render filters now know, because of the timestamp, when the data sample is to be rendered.

Now, when a user interacts with the various data streams via application 112, the user can typically alter the playback rate of the streams. For example, the user can fast forward the data streams and experience the streams at a faster playback rate. Altering the playback rate can typically take place via one of two ways. First, a global timing clock can be altered. This is referred to as a time compression or time expansion. Second, the application can instruct various filters to modify their output to make the data appear as if it was playing back at a different rate. This is referred to as a rate change. For example, if the user wishes to fast forward a data stream, the decoder filters can map the input timestamps of the individual data samples to different output timestamps so that the render filter renders the data streams at the requested playback rate.

As an example, consider FIG. 2. There, a graph 200 is provided. The x-axis is designated "Input Timestamp" and represents the input timestamp of a particular data sample. The y-axis is designated "Output Timestamp" and represents the output timestamp of a particular data sample. When a data sample is received for rendering, the source filter (such as source filter 104 in FIG. 1) provides the data sample with a timestamp that indicates when the data sample is to be rendered. The source filter then provides the data sample to the decoder filter (such as decoder filters 106–106b). Now assume that the user, through the application, indicates that the following should occur:

For the data samples with input timestamps of 1–10, they wish to have the samples rendered at a normal 1—1 play rate;

For the data samples with the input timestamps of 11–20, they wish to have the samples rendered at 5 times the normal rate (i.e. fast forwarded at 5x).

As part of the process that takes place, the decoder filters can adjust the timestamps for the relevant samples so that the samples' output timestamps now comport with the desired playback speeds (i.e. play at 1—1 rate and fast forward at 5x). For example, in order to render the data samples that originally had timestamps of 11–20 (10 timestamps in total) at 5 times the playback rate, those samples will need to be rendered as if they had timestamps of 11 and 12 (i.e. 2 timestamps in total).

So, with this in mind, consider again FIG. 2. For input timestamps of 1–10 there is a one-to-one correspondence between input and output timestamps, meaning that the data samples will be rendered at a normal play rate. Input timestamps of 11–20 will, however, be mapped to output timestamps of 11 and 12 because of the 5x fast forward play rate. Thus, when the render filters receive the data samples with the re-mapped timestamps, the data samples will be rendered in accordance with the desired playback speeds.

Now, in reality, the re-mapping of timestamps can lead to synchronization problems in the following way. Consider, for example, that the individual decoder filters can have different computational models. That is, the different decoder filters might be provided from different vendors. Accordingly, the different computational models may perform computations for purposes of re-mapping time stamps differently. Specifically, the computational models may perform rounding operations differently. Because of this, the re-mapped timestamps can vary as between data samples that should for all practical purposes be rendered together. This can manifest itself in some different ways. For example, the audio that accompanies the video may lag just enough to be annoying. Additionally, sub-pictures such as video overlays may be overlaid at the wrong time. Thus, the user experience can be degraded.

Products utilizing the filter graph have been well received in the market as it has opened the door to multimedia editing using otherwise standard computing systems. Yet, there continues to be a need to improve filter graph technology and further enhance the user experience, or at least not degrade it.

Accordingly, this invention arose out of concerns associated with providing improved methods and systems for synchronizing timestamped data streams and, in particular, timestamped data streams associated with filter graphs.

SUMMARY

Methods and systems are provided for synchronizing various time-stamped data streams. The data streams can be synchronized to another data stream or to a point of reference such as a reference clock. Synchronization can take place periodically or in accordance with a defined tolerance which, if equaled or exceeded, can be used to trigger a synchronization process.

In one embodiment, synchronization processing takes place in association with a filter graph comprising multiple filters. The filter graph is configured to process multiple timestamped data streams for rendering the data streams in accordance with data stream timestamps. A synchronization module is provided and is associated with the filter graph. The synchronization module is configured to query individual filters of the filter graph to ascertain input timestamp-to-output timestamp mappings. The module then computes adjustments that are to be made to output timestamps in order to synchronize the data streams, and then instructs queried filters to adjust their output timestamps in accordance with its adjustment computations.

BRIEF DESCRIPTION OF THE DRAWINGS

FIG. 7 is a graph that describes input/output timestamp mappings associated with the FIG. 6 filter graph.

FIG. 10 is a graph that describes input/output timestamp mappings associated with another embodiment.

DETAILED DESCRIPTION

Overview

Methods and systems are provided for synchronizing various time-stamped data streams. The data streams can be synchronized to another data stream or to a point of reference such as a reference clock. Synchronization can take place periodically or in accordance with a defined tolerance which, if equaled or exceeded, can be used to trigger a synchronization process.

Exemplary Computing Environment

Figure 3:
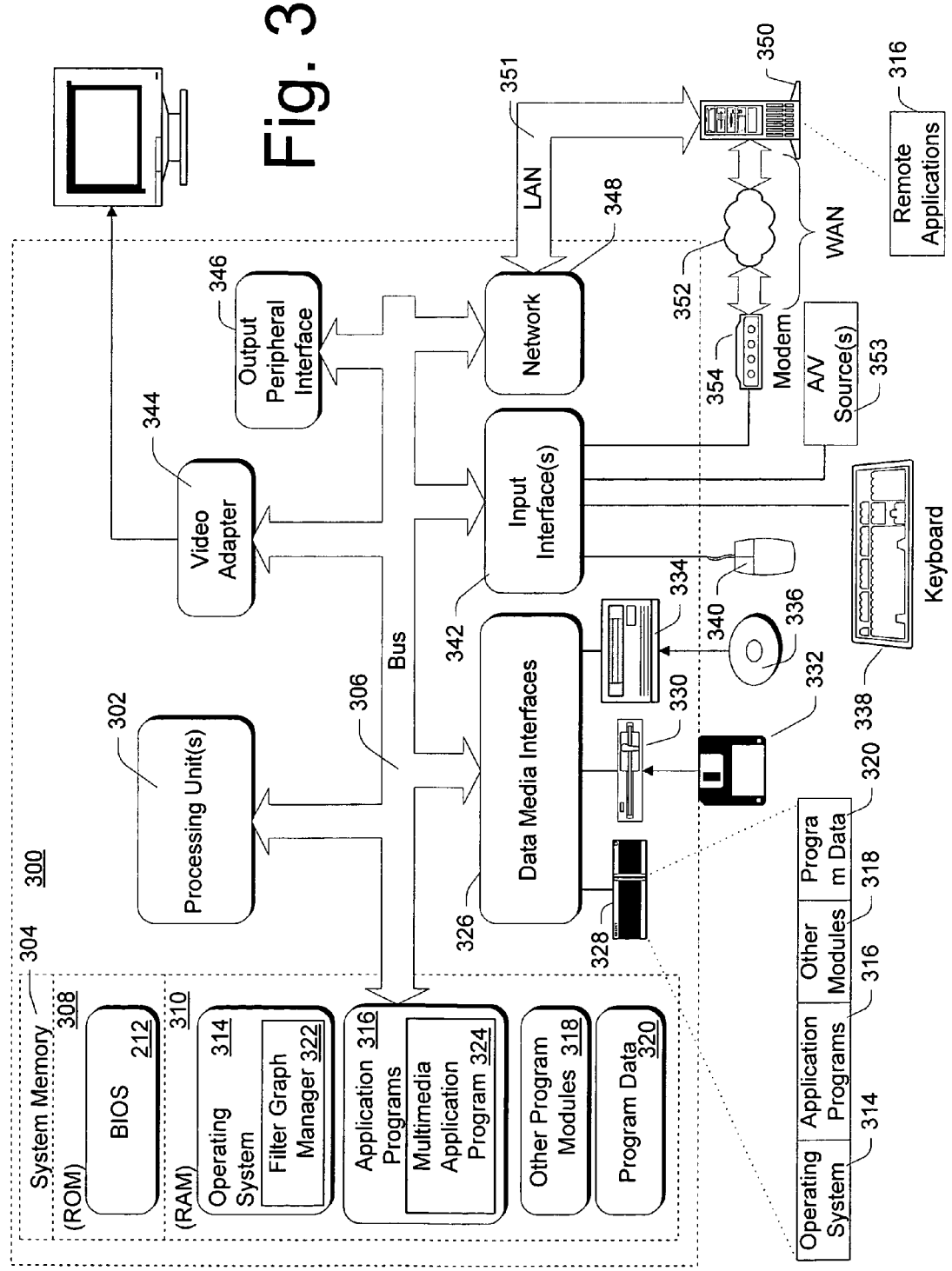
FIG. 3 is a block diagram that illustrates an exemplary computer system that can be used to implement various embodiments described below.

FIG. 3 illustrates an example of a suitable computing environment 300 on which the system and related methods for processing media content may be implemented.

It is to be appreciated that computing environment 300 is only one example of a suitable computing environment and is not intended to suggest any limitation as to the scope of use or functionality of the media processing system. Neither should the computing environment 300 be interpreted as having any dependency or requirement relating to any one or combination of components illustrated in the exemplary computing environment 300.

The media processing system is operational with numerous other general purpose or special purpose computing system environments or configurations. Examples of well known computing systems, environments, and/or configurations that may be suitable for use with the media processing system include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, the system and related methods for processing media content may well be described in the general context of computer-executable instructions, such as program modules, being executed by a computer. Generally, program modules include routines, programs, objects, components, data structures, etc. that perform particular tasks or implement particular abstract data types. The media processing system may also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 3 computing system 300 is shown comprising one or more processors or processing units 302, a system memory 304, and a bus 306 that couples various system components including the system memory 304 to the processor 302.

Bus 306 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 300 typically includes a variety of computer readable media. Such media may be any available media that is locally and/or remotely accessible by computer 300, and it includes both volatile and non-volatile media, removable and non-removable media.

In FIG. 3, the system memory 304 includes computer readable media in the form of volatile, such as random access memory (RAM) 310, and/or non-volatile memory, such as read only memory (ROM) 308. A basic input/output system (BIOS) 312, containing the basic routines that help to transfer information between elements within computer 300, such as during start-up, is stored in ROM 308. RAM 310 typically contains data and/or program modules that are immediately accessible to and/or presently be operated on by processing unit(s) 302.

Computer 300 may further include other removable/non-removable, volatile/non-volatile computer storage media. By way of example only, FIG. 3 illustrates a hard disk drive 328 for reading from and writing to a non-removable, non-volatile magnetic media (not shown and typically called a "hard drive"), a magnetic disk drive 330 for reading from and writing to a removable, non-volatile magnetic disk 332 (e.g., a "floppy disk"), and an optical disk drive 334 for reading from or writing to a removable, non-volatile optical disk 336 such as a CD-ROM, DVD-ROM or other optical media. The hard disk drive 328, magnetic disk drive 330, and optical disk drive 334 are each connected to bus 306 by one or more interfaces 326.

The drives and their associated computer-readable media provide nonvolatile storage of computer readable instructions, data structures, program modules, and other data for computer 300. Although the exemplary environment described herein employs a hard disk 328, a removable magnetic disk 332 and a removable optical disk 336, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 328, magnetic disk 332, optical disk 336, ROM 308, or RAM 310, including, by way of example, and not limitation, an operating system 314, one or more application programs 316 (e.g., multimedia application program 324), other program modules 318, and program data 320. In accordance with the illustrated example embodiment of FIG. 3, operating system 314 includes an application program interface embodied as a render engine 322. As will be developed more fully below, render engine 322 is exposed to higher-level applications (e.g., 316) to automatically assemble filter graphs in support of user-defined development projects, e.g., media processing projects. Unlike conventional media processing systems, however, render engine 322 utilizes a scalable, dynamically reconfigurable matrix switch to reduce filter graph complexity, thereby reducing the computational and memory resources required to complete a development project. Various aspects of the innovative media processing system represented by a computer 300 implementing the innovative render engine 222 will be developed further, below.

Continuing with FIG. 3, a user may enter commands and information into computer 300 through input devices such as keyboard 338 and pointing device 340 (such as a "mouse"). Other input devices may include a audio/video input device(s) 353, a microphone, joystick, game pad, satellite dish, serial port, scanner, or the like (not shown). These and other input devices are connected to the processing unit(s) 302 through input interface(s) 342 that is coupled to bus 306, but may be connected by other interface and bus structures, such as a parallel port, game port, or a universal serial bus (USB).

A monitor 356 or other type of display device is also connected to bus 306 via an interface, such as a video adapter 344. In addition to the monitor, personal computers typically include other peripheral output devices (not shown), such as speakers and printers, which may be connected through output peripheral interface 346.

Computer 300 may operate in a networked environment using logical connections to one or more remote computers, such as a remote computer 350. Remote computer 350 may include many or all of the elements and features described herein relative to computer 300 including, for example, render engine 322 and one or more development applications 316 utilizing the resources of render engine 322.

As shown in FIG. 3 computing system 300 is communicatively coupled to remote devices (e.g., remote computer 350) through a local area network (LAN) 351 and a general wide area network (WAN) 352. Such networking environments are commonplace in offices, enterprise-wide computer networks, intranets, and the Internet.

When used in a LAN networking environment, the computer 300 is connected to LAN 351 through a suitable network interface or adapter 348. When used in a WAN networking environment, the computer 300 typically includes a modem 354 or other means for establishing communications over the WAN 352. The modem 354, which may be internal or external, may be connected to the system bus 306 via the user input interface 342, or other appropriate mechanism.

In a networked environment, program modules depicted relative to the personal computer 300, or portions thereof, may be stored in a remote memory storage device. By way of example, and not limitation, FIG. 3 illustrates remote application programs 316 as residing on a memory device of remote computer 350. It will be appreciated that the network connections shown and described are exemplary and other means of establishing a communications link between the computers may be used.

Exemplary Embodiment

Figure 4:
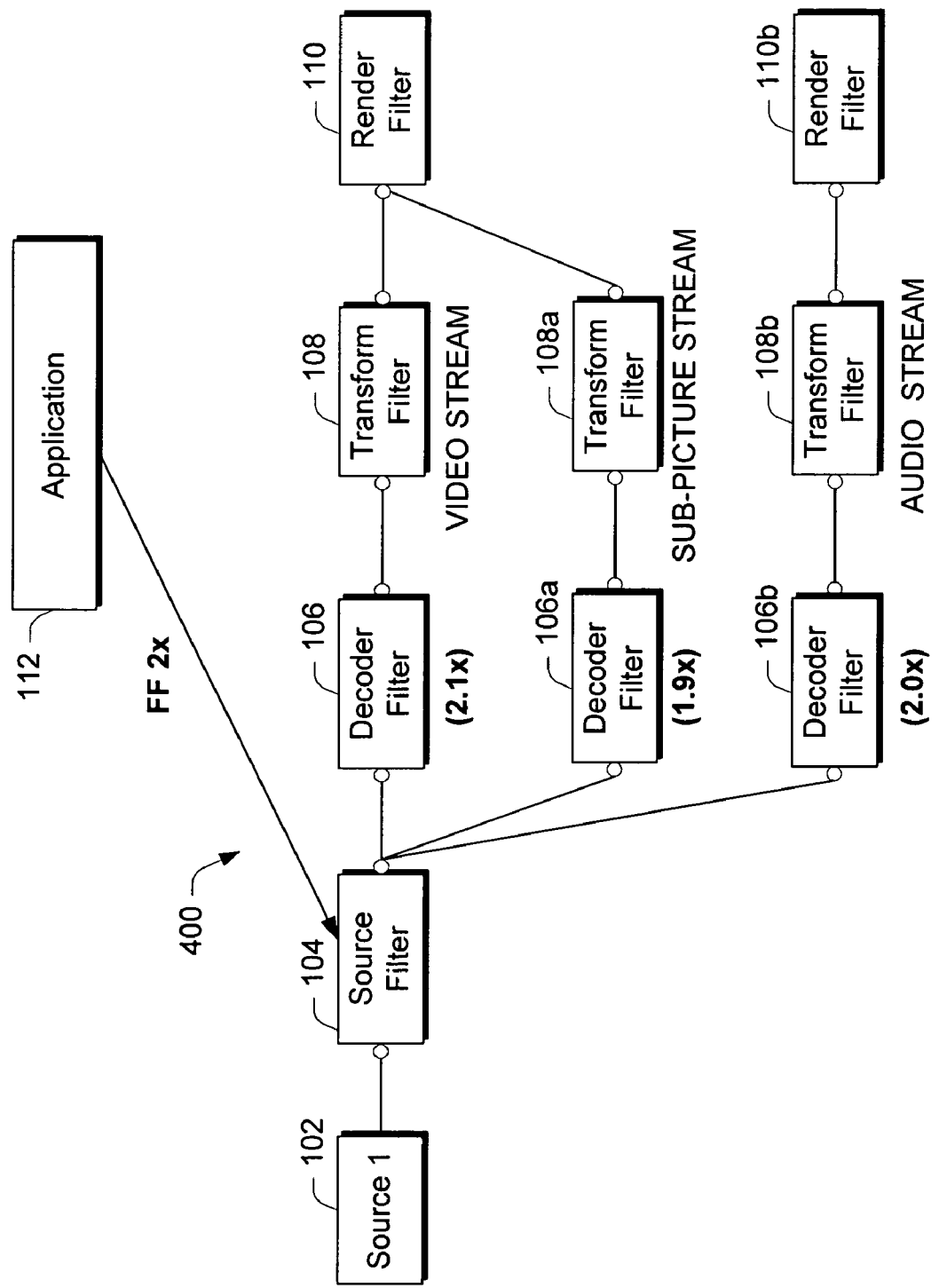
FIG. 4 is a diagram of an exemplary filter graph and is useful in understanding various concepts associated with the described embodiments.

For purposes of understanding various principles upon which the various inventive embodiments are based, consider FIG. 4.

Figure 1:
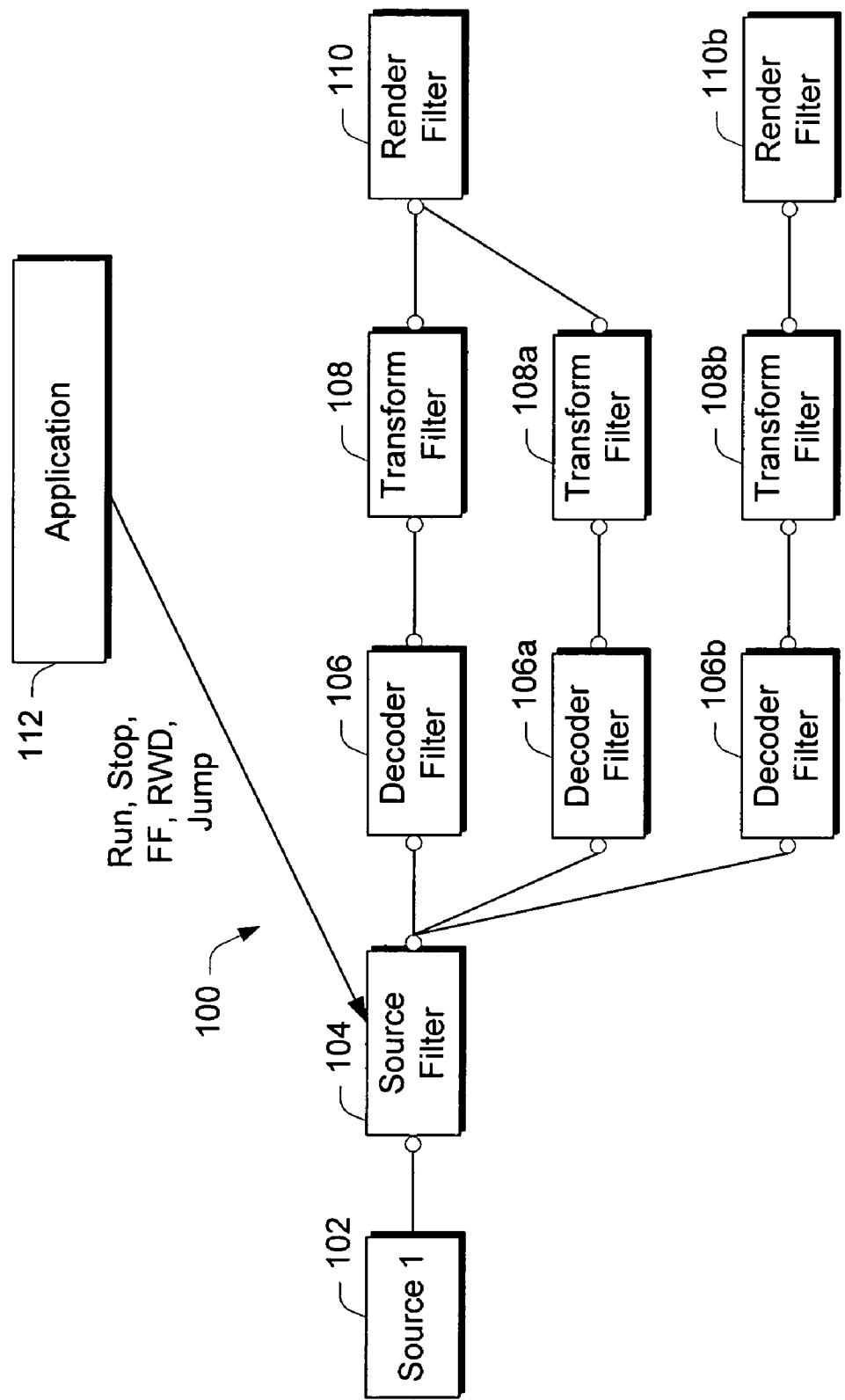
FIG. 1 is a diagram of an exemplary conventional filter graph.
Figure 2:
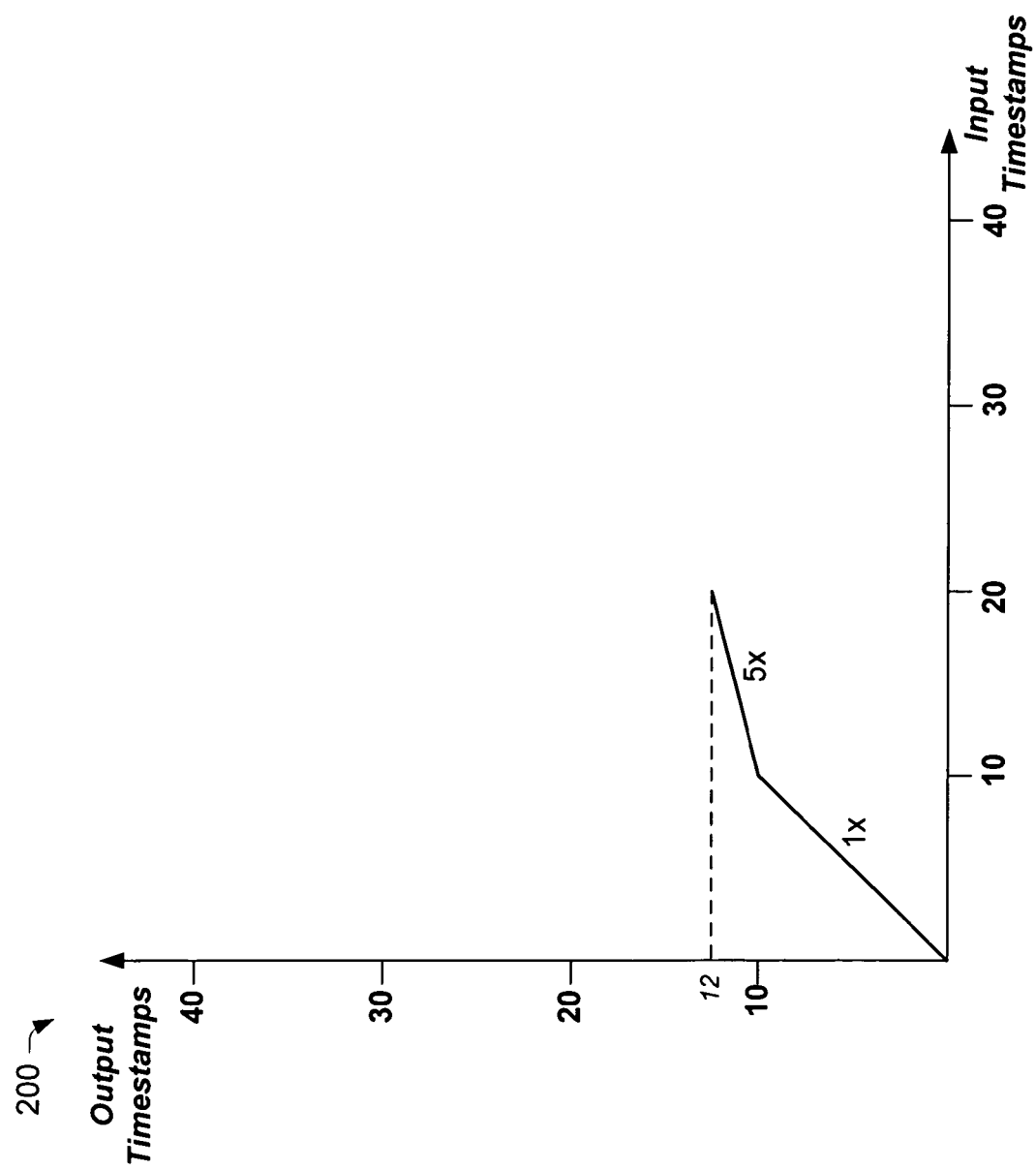
FIG. 2 is a graph that is useful in understanding various concepts associated with the described embodiments.

There, a filter graph 400 is shown and is similar to filter graph 100 in FIG. 1. Assume in this example, that each of the decoder filters 106, 106a and 106b is slightly computationally different in that output timestamps are assigned in a slightly different way. For example, assume that the application 112 has indicated to the source filter 104 that the user wishes to have the data streams rendered at 2× the playback rate. Assume also that because of the computational differences of the various decoders, timestamps are re-mapped in such a way that the video stream associated with decoder filter 106 will be rendered at 2.1× the playback speed (i.e. slightly faster); the sub-picture stream will be rendered at 1.9× the playback speed (i.e. slightly slower); and the audio stream will be rendered at 2.0× the playback speed (i.e. the correct speed). As will be appreciated, these streams will, over time, tend to drift relative to one another.

Figure 5:
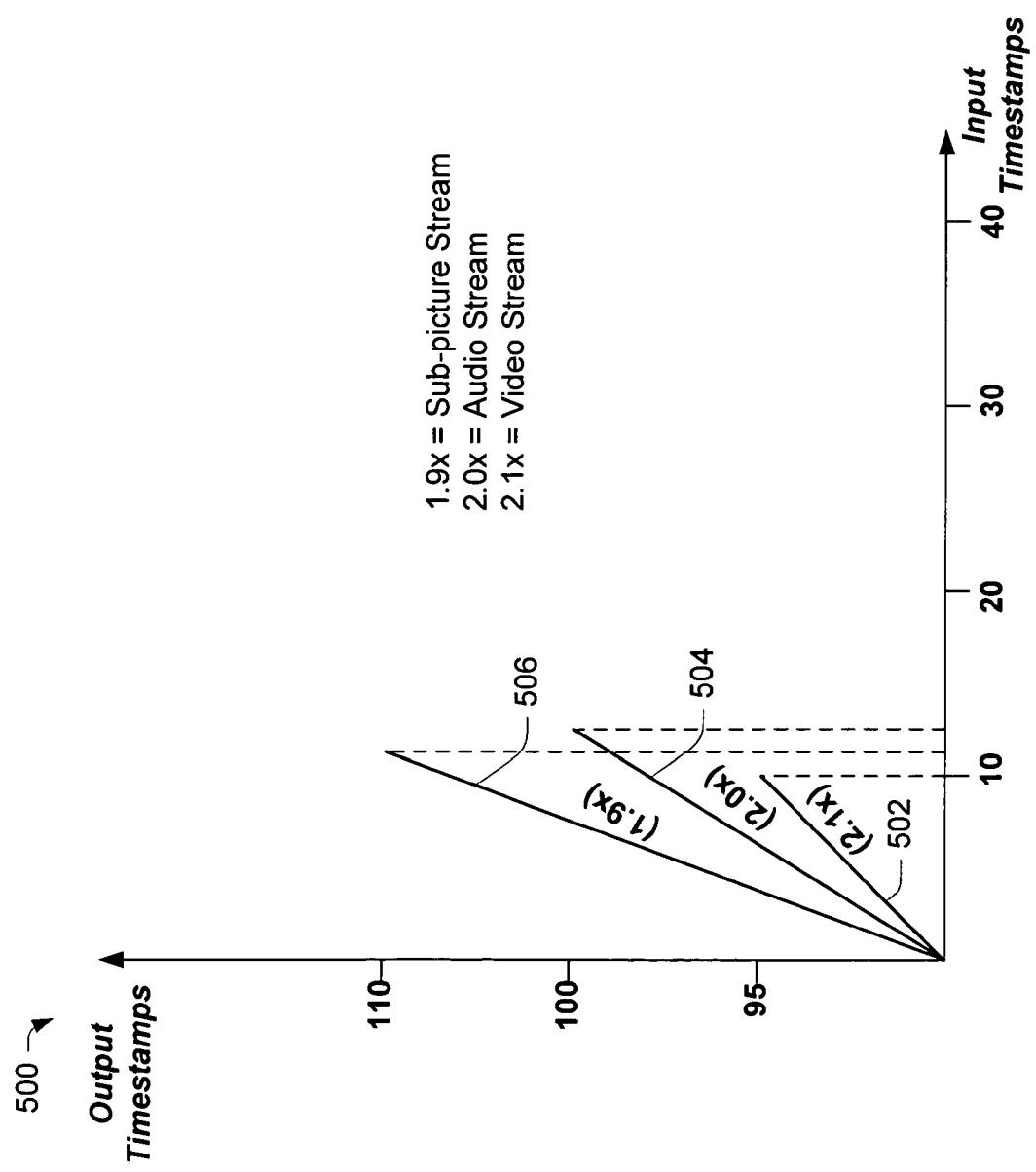
FIG. 5 is a graph that describes input/output timestamp mappings.

As an example, consider FIG. 5 which shows a graph that illustrates the mapping of the input timestamps to output timestamps for each of the FIG. 4 decoders. Specifically, line 502 comprises the mapping for the decoder associated with the video stream (i.e. decoder 106 in FIG. 4), line 504 comprises the mapping for the decoder associated with the audio stream (i.e. decoder 106b in FIG. 4), and line 506 comprises the mapping for the decoder associated with the sub-picture stream (i.e. decoder 106a in FIG. 4). These lines or curves should ideally, without any drift, lie on top of each other. That is, without any drift, the input timestamps for each input timestamp value should map to the same output timestamp value. Unfortunately, because of the drift, this does not occur. For example, notice that for an input timestamp of 10, the output timestamp for each of the streams is different.

Figure 6:
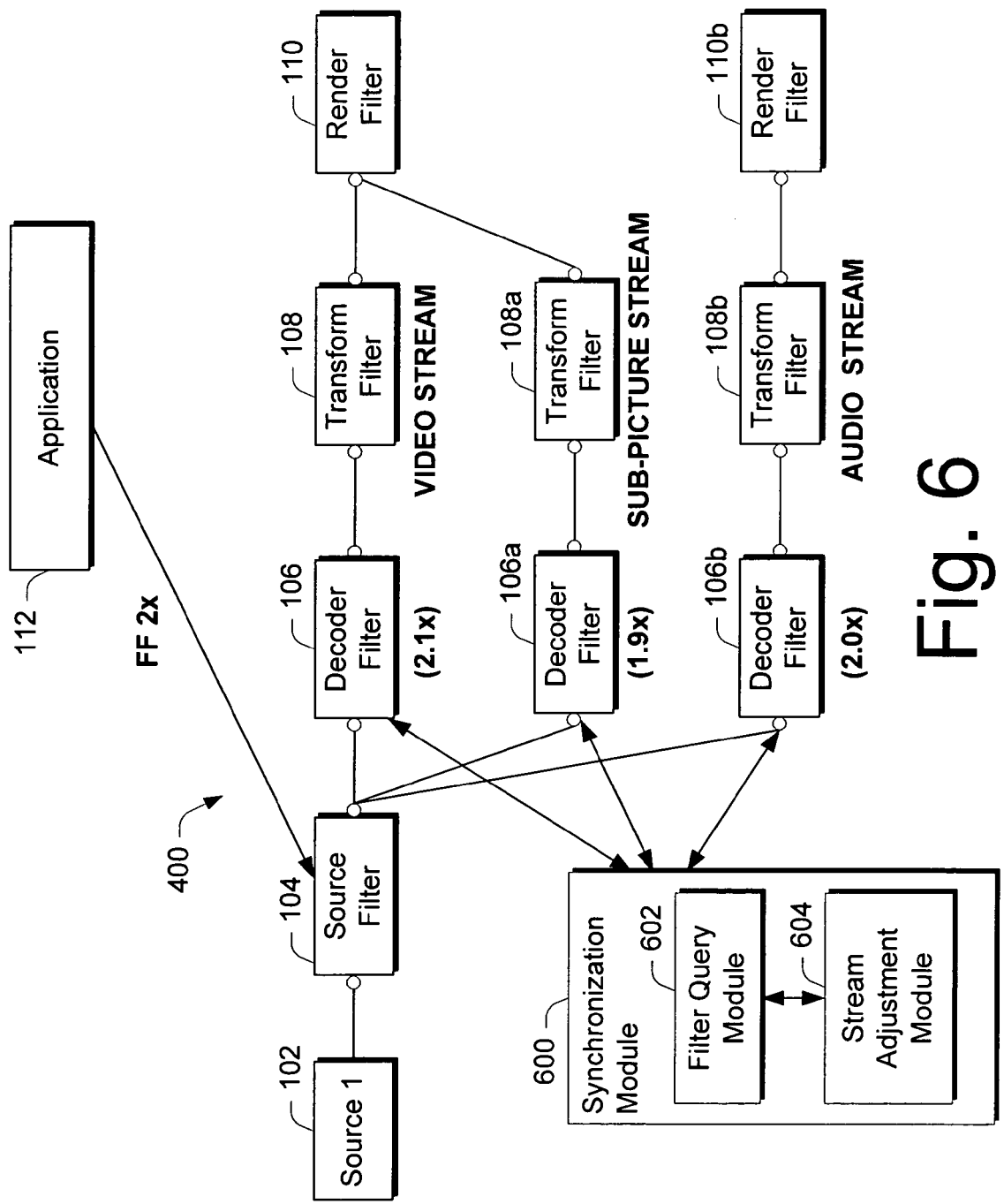
FIG. 6 is a diagram of an exemplary filter graph and synchronization module in accordance with one embodiment.

Consider now FIG. 6. There, a synchronization module 600 is provided. The synchronization module can be implemented in any suitable hardware, software, firmware or combination thereof. In the illustrated example, the synchronization module is implemented in software.

The synchronization module is configured to periodically query individual filters and instruct the filters to adjust the output timestamps of individual data samples so that the data streams are synchronized. In the present example, module 600 queries each of the decoder filters and then instructs the decoder filters to adjust the output timestamps for synchronizing the data streams. In this particular embodiment, the synchronization module comprises a filter query module 602 that queries the individual filters, and a stream adjustment module 604 that computes the adjustments that should be made to the output timestamps.

One solution to synchronizing the individual data streams is to ascertain the current input timestamp and assume that all decoder filters are at the current input time stamp. The decoder filters can then be queried as to their output timestamp mappings for the assumed current input timestamp mapping. When the decoder filters respond with their corresponding output timestamp, the furthest output timestamp can be ascertained and then the decoder filters that do not correspond to the decoder filter having the furthest output timestamp can be instructed to start assigning output timestamps at a value equal to the furthest output timestamp.

Consider, for example, FIG. 5. When the decoder filters are queried, they will each respond with their current output timestamp. However, because the streams are continuously being processed, the assumption that the current input timestamp is at 10 is not entirely accurate. For example, when decoder filter 106 (FIG. 6) is queried, the input timestamp may well be 10. Thus, for decoder 106 this is a good assumption. However, because of the serial nature of the querying and the advancing time, when decoder filter 106a is queried, the corresponding input timestamp will likely not be 10, but rather might be 10.1. Thus, for decoder 106a, the assumption that the current input timestamp is 10 is not an accurate assumption. Similarly, when the decoder filter 106b is queried, the input timestamp may actually be 10.2. Thus, for decoder 106b, the assumption that the current input timestamp is 10 is not an accurate assumption.

Thus, while this approach may bring the data streams into closer synchronization, this is not the best as its underlying assumption concerning the current input timestamp is not accurate with respect to all of the decoders.

Consider now FIG. 6 in connection with FIG. 5. Because of the real time nature of the environment in which the querying takes place, the data streams are simultaneously being processed while the querying takes place.

In accordance with one embodiment, each of the decoder filters is queried to ascertain the current input timestamp and the current output timestamp. In addition, if the actual playback rate of the decoder is not known, each decoder can be queried for its playback rate. Once this information is ascertained, synchronization module 600 can compute an output timestamp for a specific input timestamp and then instruct one or more of the decoders to synchronize their output timestamps to the computed output timestamp.

For example, module 600 can query the individual decoder filters in a serial fashion. For example, the module 600 might query decoder filter 106 first, and then decoder filter 106a and then decoder filter 106b. This is diagrammatically shown in the graph of FIG. 5. There, notice that at a time that corresponds to input timestamp 10, decoder filter 106 is queried to provide its current input timestamp and the corresponding output timestamp that is associated with input timestamp 10. Ideally, we assume the decoder would map an input timestamp of 10 to an output timestamp of 100. Because decoder filter 106 is slightly faster than the actual requested playback speed it responds with a value of 95. Likewise, at the next query time (which is shortly after the first query time and which corresponds to an input timestamp of 10.1), decoder filter 106a is queried to provide its current input timestamp and the corresponding output timestamp that is associated with input timestamp 10.1. Because decoder filter 106a is slightly slower than the actual requested playback speed, it responds with a value of 110. Likewise, at the next query time (which is shortly after the second query time and which corresponds to an input timestamp of 10.2), decoder filter 106b is queried to provide its current input timestamp and the corresponding output timestamp that is associated with input timestamp 10.2. Because decoder filter 106b is synchronized with the actual requested playback speed, it responds with a value of 100.1

(see table for computation). Thus, the table below summarizes the mappings of current input timestamps to output timestamps. Note additionally that if the playback rates of the decoders are not known, the decoders can be queried for their playback rates.

| Decoder | Input Timestamp | Output Timestamp | Rate | Output Timestamp At 10.2 Output + (output − 10.2)/rate |
|---|---|---|---|---|
| Decoder 106 | 10 | 95 | 2.1 | 95 + 0.2/2.1x = 95.0952 |
| Decoder 106a | 10.1 | 110 | 1.9 | 110 + 0.1/1.9x = 110.0526 |
| Decoder 106b | 10.2 | 100.1 | 2.0 | 100.1 + 0/2.0x = 100.1 |

In accordance with one embodiment, once the decoder filters have been queried and have responded with their individual mappings, the synchronization module 600 can extrapolate each of the lines characterizing the timestamp mappings to a defined point corresponding to a common input timestamp. Corrections can then be calculated and the decoders can be instructed to synchronize their output timestamp mappings accordingly.

As an example of how this can be done, consider FIG. 7 which shows a mapping of input timestamps to output timestamps generally at 700. First notice that in this example the line that characterizes each of the mappings of input timestamps to output timestamps can be characterized by the classic line equation $y = mx + b$. Here, the y variable represents the output timestamp, the x variable represents the input timestamp and the slope m represents the playback rate, and b is a constant.

In this specific example, each of the lines characterizing the mappings of I input timestamp to output timestamp is extrapolated, if necessary, to the largest value of input timestamp that was returned by the query. In this example, and from the table above, the largest input timestamp value that was returned as a result of the query of decoder filters is 10.2. Accordingly, lines 502 and 506 are extrapolated to the input timestamp of 10.2. Notice that the input timestamp of 10.2 is represented vertically by the dashed line extending upward from the value of 10.2. Notice also that the extrapolated portion of each of lines 502, 506 is respectively shown at 502a and 506a.

Once the individual lines have been extrapolated, a skip parameter can be calculated. The skip parameter represents a value that can be used to synchronize the output timestamps of the various decoders. In this example, the skip value is computed by taking the difference between the largest output timestamp value for the given input timestamp value and the output timestamp value for the line characterizing the decoder mappings for the given decoders for the given input timestamp. As an example, consider again FIG. 7. There, the skip value for line 502 is computed by taking the difference between 110.0526 (i.e. the largest output timestamp value for the given input timestamp value of 10.2) and 95.0952 (i.e. the output timestamp value for lines 502 at the input timestamp value of 10.2) to provide a skip value of 14.9574. Likewise, the skip value for line 504 is computed by taking the difference between 110.0526 (i.e. the largest output timestamp value for the given input timestamp value of 10.2) and 100.1 (i.e. the output timestamp value for lines 504 at the input timestamp value of 10.2) to provide a skip value of 9.9526.

Next, individual decoders are instructed to jump their output timestamps by their individual skip values for the corresponding input timestamp. Here, for an input timestamp of 10.2, the individual decoders would be instructed to add their associated skip value to their output timestamp. This has the desirable effect of adjusting the ends of each of lines 502, 504 upwardly to coincide with the end of line 506. Hence, the data streams are brought back into a desirable level of synchrony.

The reader should appreciated that the skip value can be calculated relative to any desirable common input timestamp. In this particular example, the input time stamp of the last-queried decoder was used. This need not, however, be the case. For example, the process can select a particular input timestamp in the future, say 10.5, and extrapolate all of the lines characterizing the mappings to 10.5. Then, all of the decoders can be instructed to jump by the computed skip value when the input timestamp value corresponds to 10.5.

It should also be noted that the above-described process can be repeated periodically to ensure that the data streams remain synchronized at a desired level of synchrony. It should also be appreciated that a skip value tolerance can be defined and the synchronization process can be performed any time that any of the decoder skip values exceed or equal the skip value tolerance. For example, assume that a skip value tolerance of 10 is defined. In this case, the mappings of input timestamps to output timestamps can be monitored for each of the decoders. This is diagrammatically analogous to monitoring each of the lines 502, 504, and 506. Then, any time a skip value for any of the lines equals or exceeds the skip value tolerance, the synchronization process can be performed.

Figure 8:
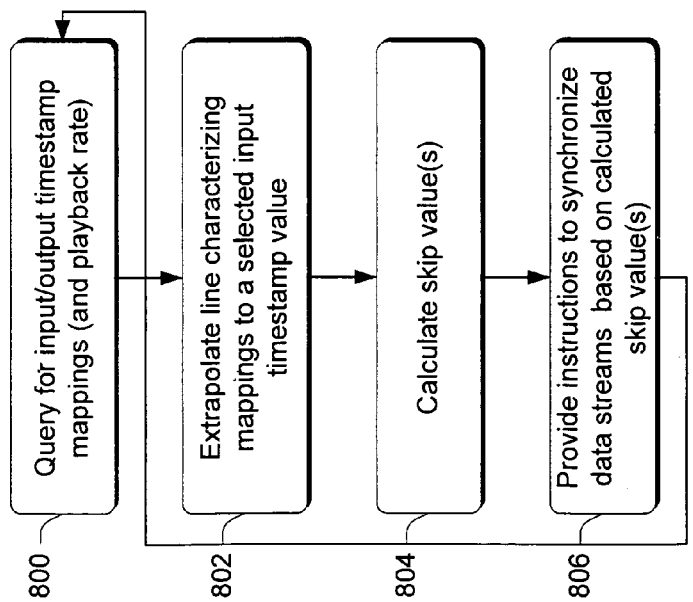
FIG. 8 is a flow diagram that describes steps in a method in accordance with one embodiment.

FIG. 8 is a flow diagram that illustrates steps in a method in accordance with one embodiment. The method can be implemented in any suitable hardware, software, firmware or combination thereof. In the illustrated example, the method is implemented in software. The method can be implemented by a synchronization module such as module 600 if FIG. 6.

Step 800 queries one or more filters for their input/output timestamp mappings. Additionally, if the individual playback rates for the filters are not known, then step 800 can also query for the playback rates. Any suitable filter can be queried. In the particular example above, the decoder filters are queried. If, in some systems, the decoder filters are not the filters that perform the input/output timestamp mappings, then the filters that perform those mappings can be queried. Responsive to receiving responses from the queried filters, step 802 extrapolates lines characterizing the mappings to a selected input timestamp value. The extrapolation can be accomplished using any suitable extrapolation function. For example, in the above examples the extrapolation was a linear extrapolation. It is possible, however, for the lines that characterize the mappings to be non-linear. In this case, the extrapolation can be non-linear. Additionally, the selected input timestamp value to which such lines are extrapolated can comprise any desirable value. For example, the selected input timestamp value can comprise a current input timestamp value for one of the filters (as in the FIG. 5 example). Alternately, the current input timestamp value can comprise a future input timestamp value. Once the lines are extrapolated, step 804 calculates skip values for one or more of the lines. The skip values represent a value by which the output timestamps for a given filter are to be corrected for the selected input timestamp value. One example of how skip values can be calculated is given above.

Once the skip values are calculated for the individual filters, step 806 provides instructions to synchronize the data streams based on the calculated skip values. In the above example, this was accomplished by instructing the filters to skip their output timestamps ahead by an associated skip value, for a selected input timestamp. Step 806 can then return to step 800 and the process can be periodically repeated to maintain the data streams in synchrony.

Figure 9:
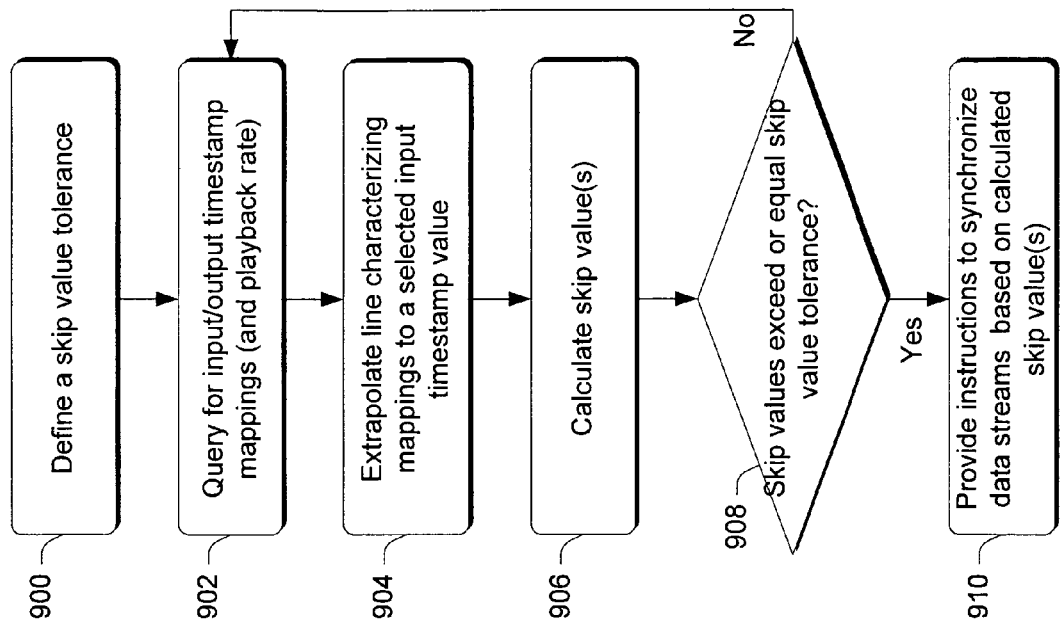
FIG. 9 is a flow diagram that describes steps in a method in accordance with one embodiment.

FIG. 9 is a flow diagram that illustrates steps in a method in accordance with one embodiment. The method can be implemented in any suitable hardware, software, firmware or combination thereof. In the illustrated example, the method is implemented in software. The method can be implemented by a synchronization module such as module 600 if FIG. 6.

In this process, a skip value tolerance is defined and synchronization processing is performed whenever the data streams become unsynchronized enough to meet or exceed the skip value tolerance.

Accordingly, step 900 defines a skip value tolerance. Step 902 queries one or more filters for their input/output timestamp mappings. Additionally, if the individual playback rates for the filters are not known, then step 902 can also query for the playback rates. Any suitable filter can be queried. In the particular example above, the decoder filters are queried. If, in some systems, the decoder filters are not the filters that perform the input/output timestamp mappings, then the filters that perform those mappings can be queried. Responsive to receiving responses from the queried filters, step 904 extrapolates lines characterizing the mappings to a selected input timestamp value. The extrapolation can be accomplished using any suitable extrapolation function. For example, in the above examples the extrapolation was a linear extrapolation. It is possible, however, for the lines that characterize the mappings to be non-linear. In this case, the extrapolation can be non-linear. Additionally, the selected input timestamp value to which such lines are extrapolated can comprise any desirable value. For example, the selected input timestamp value can comprise a current input timestamp value for one of the filters (as in the FIG. 5 example). Alternately, the current input timestamp value can comprise a future input timestamp value. Once the lines are extrapolated, step 906 calculates skip values for one or more of the lines. The skip values represent a value by which the output timestamps for a given filter can be corrected for the selected input timestamp value. One example of how skip values can be calculated is given above.

Once the skip values are calculated for the individual filters, step 908 ascertains whether any of the calculated skip values exceed or equal the skip value tolerance. If none of the calculated skip values exceed or equal the skip value tolerance, then the method can return to step 902. Alternately, if the extrapolated lines are accurately predictable into the future, then the method can ascertain when, in fact, the calculated skip values will exceed or equal the skip value tolerance. If this is the case, or if the calculated skip values exceed or equal the skip value tolerance, then step 910 can provide instructions to synchronize the data streams. In the case where the calculated skip values actually exceed or equal the skip value tolerance, then the instructions to synchronize the data streams can be based on the actually calculated skip values. In the case where the method determines at which point in the future the calculated skip values will exceed or equal the skip value tolerance, then instructions can be based skip values that are calculated for the future.

Synchronizing Based on a Point of Reference

In another embodiment, a point of reference is defined and the data streams are periodically synchronized to the point of reference. Synchronization can take place periodically or when skip values exceed a defined skip value tolerance relative to the point of reference. As an example, consider FIG. 10.

There, a mapping of input timestamps to output timestamps for two data streams is shown generally at 1000. Assume that in this case, line 1002 represents that mapping for an audio stream and line 1004 represents the mapping for a video stream. Assume also that the requested playback rate is 2×. As shown, the audio stream is being provided with output timestamps such that it will be rendered slightly slower than the requested 2× rate. Likewise, the video stream is being provided with output timestamps such that it will be rendered slightly faster than the requested 2× rate. Over time, this disparity will lead to drifting between the streams which, in turn, will degrade the user experience.

Notice also in this example that a point of reference or "Reference Clock" is provided. This point of reference defines the reference to which the data streams are to be synchronized.

As in the above example, synchronization takes place by querying the filters for their input/output timestamp mappings and, if needed, their playback rate. The lines characterizing these mappings are then extrapolated to a selected input timestamp. In this example, assume that the filters associated with lines 1002 and 1004 are queried when their input timestamp values are around 10 and respond with output timestamps of 105 for the audio decoder and 95 for the video decoder. Assume that the ideal reference clock is at 100. Based on the information returned by the query, each of these lines is extrapolated to a selected input timestamp of 16 (as indicated by the dashed line). Now, skip values can be calculated based on the extrapolated lines and the point of reference. At 106, the audio timestamp would be 108.16 and the video timestamp would be 97.86. The reference clock would have advanced to 103. Here, the skip value for line 1002 is ascertained by, for an input timestamp value of 16, taking the difference of the output timestamps between the reference clock and line 1002 (i.e. 103−108.16=−5.16). Similarly, the skip value for line 1004 is ascertained by, for an input timestamp value of 16, taking the difference of the output timestamps between the reference clock and line 1004 (i.e. 103−97.86=5.14). Now, the filters can be instructed to synchronize their data streams to the point of reference based on the calculated skip values. In the case of the filter processing the audio stream (i.e. corresponding to line 1002), the filter would subtract 5.16 from its output timestamp when its corresponding input time stamp value equals 16. Similarly, in the case of the filter processing the video stream (i.e. corresponding to line 1004), the filter would add 5.14 to its output timestamp when its corresponding input timestamp value equals 16.

In this way, the data streams can be synchronized to a point of reference or a reference clock. Synchronization can take place periodically or relative to a tolerance value that can be defined, as explained above.

Conclusion

The described methods and systems provide a general solution that can be applied to many multimedia streaming and network scheduling applications that utilize timestamps to render data streams. By synchronizing the data streams as described above, the user experience can be greatly enhanced. In addition, synchronization problems due to differing computation models as between different components that process data streams can be largely mitigated. This, in turn, can provide flexibility insofar as providing the ability to mix and match components that might, for example, be provided by different vendors.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
providing, in a filter graph, at least one time-stamped data stream that is to be rendered in accordance with data stream timestamps; and
synchronizing said at least one time-stamped data stream relative to an internal time-stamped data stream being processed by the filter graph by adjusting one or more timestamps of said at least one time-stamped data stream wherein, the act of synchronizing utilizes extrapolation based processing to synchronize said at least one time-stamped data stream relative to the internal time-stamped data stream.

2. The method of claim 1, wherein the act of synchronizing comprises doing so periodically.

3. The method of claim 1, wherein the act of synchronizing comprises determining whether said at least one time-stamped data stream is within a defined tolerance and, if not, performing said act of synchronizing.

4. The method of claim 1, wherein said at least one time-stamped data stream comprises a video stream.

5. The method of claim 1, wherein said at least one time-stamped data stream comprises an audio stream.

6. The method of claim 1, wherein said at least one time-stamped data stream comprises a video stream and an audio stream.

7. A method comprising:
providing a filter graph comprising multiple filters, the filter graph being configured to process multiple time-stamped data streams for rendering the data streams in accordance with data stream timestamps; and
synchronizing at least one time-stamped data stream relative to a reference by adjusting one or more timestamps of said at least one lime-stamped data stream wherein, the act of synchronizing can be performed by querying filters of the filter graph upstream of a rendering filter, and wherein the act of synchronizing comprises instructing one or more of the filters upstream of the rendering filter to adjust at least one timestamp associated with at least one data sample of one or more of the data streams.

8. The method of claim 7, wherein the act of instructing comprises instructing one or more decoder filters to adjust at least one timestamp associated with at least one data sample.

9. The method of claim 7, wherein the reference comprises another time-stamped data stream.

10. The method of claim 7, wherein the reference comprises a reference clock.

11. The method of claim 7, wherein the act of synchronizing comprises doing so periodically.

12. The method of claim 7, wherein the act of synchronizing comprises determining whether said at least one time-stamped data stream is within a defined tolerance and, if not, performing said act of synchronizing.

13. One or more computer-readable media comprising instructions which, when executed by one or more processors, cause the one or more processors to implement the method of claim 7.

* * * * *